United States Patent

[11] 3,626,254

| | | | | |
|---|---|---|---|---|
| [72] | Inventors | Mamoru Kawakubo;<br>Shigehiko Ito, Kariya, both of Japan | [50] | Field of Search............................................ 317/148.5<br>R; 74/866 |
| [21] | Appl. No. | 64,317 | | |
| [22] | Filed | Aug. 17, 1970 | [56] | References Cited |
| [45] | Patented | Dec. 7, 1971 | | UNITED STATES PATENTS |
| [73] | Assignee | Nippondenso Kabushiki Kaisha<br>Kariya-shi, Aichi-ken, Japan | 3,324,740 6/1967 Lewis et al................... 74/866<br>3,460,406 8/1969 Strohm et al. ................ 74/866 |
| [32] | Priority | Aug. 18, 1969 | |
| [33] | | Japan | *Primary Examiner*—L. T. Hix |
| [31] | | 44/65225 | *Attorney*—Cushman, Darby & Cushman |

[54] AUTOMATIC SHIFT LINE SWITCHOVER SYSTEM FOR AUTOMATIC TRANSMISSION
1 Claim, 9 Drawing Figs.

[52] U.S. Cl...................................................317/148.5R,
74/866
[51] Int. Cl..................................................... H01h 47/32,
B60k 19/00, B60k 21/00

ABSTRACT: An automatic shift line switchover system for use in an automatic transmission for a vehicle which is responsive to electrical signals representative of the load on the engine and the vehicle speed to provide a shift signal most suitable for the specific shifting condition thereby to operate brake band means and multiple disc clutch means through a hydraulic actuating circuit for carrying out the desired shift.

AUTOMATIC SHIFT LINE SWITCHOVER SYSTEM FOR AUTOMATIC TRANSMISSION

BACKGROUND OF THE INVENTION

1. Field of the Invention

This invention relates to an automatic transmission for automative vehicles and the like comprising a hydraulic torque converter and a multispeed gear unit, and more particularly to an automatic shift line switchover system for use in such an automatic transmission.

2. Description of the Prior Art

In automatic transmissions employed heretofore in common passenger cars, the shift point is generally determined from a signal representative of the vehicle speed (taken from the output shaft of the multispeed gear unit) or a signal representative of the revolution of the prime mover or internal combustion engine and a signal representative of the negative pressure (boost pressure) in the air intake pipe of the engine or a signal representative of the amount of depression of the accelerator pedal by the driver in both the drive range for driving on a level road and the low range for driving on a mountainous road. A commonly employed method comprises obtaining these signals in the form of a high and a low fluid pressure, determining the shift point on the basis of the interrelation between these two fluid pressures, and opening or closing related valves by energizing valve actuators for selectively hydraulically operating driving means such as multiple disc clutch means and brake band means. Thus, in the conventional automatic transmission which is wholly controlled by means of fluid pressure, the detected signals in the form of fluid pressures are subject to errors and are therefore generally inaccurate. Further, the conventional automatic transmission is defective in that, when the driver kicks down the accelerator pedal as he wishes a quick shift, a certain length of time is required until the desired shift can be attained due to the delayed operation of the hydraulic circuit in responding the detected signals in the form of fluid pressures. This means that the shift point is also frequently subjected to errors. Furthermore, the conventional automatic transmission is defective in that the hydraulic actuating circuit is generally complex and bulky in construction.

SUMMARY OF THE INVENTION

With a view to overcoming these prior defects, it is an object of the present invention to provide an automatic shift line switchover system for use in an automatic transmission for a vehicle which is responsive to application of electrical signals representative of the load on the engine and the vehicle speed to provide a shift signal most suitable for the specific shifting condition thereby to operate brake band means and multiple disc clutch means through a hydraulic actuating circuit for carrying out the desired shift.

Another object of the present invention is to provide an automatic shift line switchover system of the above character which includes two independent comparing amplifiers each adapted for discriminating between two regions bisected by an automatic shift line or curve which is a function of two independent variables so as to select one of the automatic shift lines in response to an external signal. According to the present invention, the desired automatic shift line can be selected without any mutual interference since the two automatic shift lines are identified by the respective independent comparing amplifiers. Therefore, the output signal from each comparing amplifier can be suitably selected.

A further object of the present invention is to provide an automatic shift line switchover system for use in an automatic transmission for a vehicle comprising a signal generator unit for generating signal voltages which are fixed functions of the vehicle speed and throttle position for determining a plurality of automatic shift lines, a first and a second comparing amplifier for carrying out the comparison between the vehicle speed responsive signal and the throttle position responsive signal applied from said signal generator unit so as to discriminate as to whether the vehicle speed and the throttle position lie in a region in which an output signal is generated from said comparing amplifiers or in a region in which no output signal is generated from said comparing amplifiers, a switching section including two transistors which have their collectors connected respectively to the output terminals of said comparing amplifiers and their emitters connected to a common output terminal to constitute an emitter follower circuit, a switch and a transistor circuit in said switching section for selectively applying a switching signal to the input terminals of said emitter follower circuit for selecting one of the output signals delivered from said first and second comparing amplifiers so as to derive the selected output signal from said output terminal of said switching section, and an actuator means connected to said output terminal of said switching section.

In a conventional system of this kind, only one comparing amplifier is provided and the input conditions for the comparing amplifier are varied to deal with the two shift lines corresponding to the drive range and the low range, respectively. The system according to the present invention is advantageous over the conventional system in that there is no mutual interference between these two shift lines and the two sets of signals which are respectively the different functions of the vehicle speed and throttle position can be applied to the comparing amplifiers. Further, by suitably selecting the polarity of the output signals delivered from the first and second comparing amplifiers, the vehicle driver can select a suitable automatic shift line depending on the driving conditions of the vehicle running on a level road, mountainous road or other road so as to attain a shift under a variety of operating conditions.

According to the present invention, the vehicle speed and throttle position signals can be compared with each other with high accuracy due to the fact that the comparing amplifiers are employed therein. In addition, the switching section has a very simple structure, is substantially trouble-free and can operate reliably since the switchover from one automatic shift line to the other can be carried out by selectively deriving one of the outputs from the first and second comparing amplifiers. Further, because of the fact that the switching section employs a transistor emitter follower circuit instead of a mechanical selector switch, noises produced by a spark and the like can be quickly absorbed by the emitter follower circuit thereby ensuring an increased reliability and a rapid switching operation. If a selector switch were solely employed in the system for the purpose of direct switching operation, there is necessarily a period of time during which no output signals from the first and second comparing amplifiers can be supplied to the actuator means. The present invention eliminates such a drawback.

BRIEF DESCRIPTION OF THE DRAWINGS

FIG. 1b is an automatic shift diagram illustrating the operation of the first comparing amplifier shown in FIG. 1a.

FIG. 2b is an automatic shift diagram illustrating the operation of the second comparing amplifier shown in FIG. 2a.

DESCRIPTION OF THE PREFERRED EMBODIMENTS

Figure 1A:
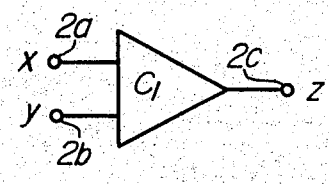
FIG. 1a is a block diagram of a first comparing amplifier forming part of an automatic shift line switchover system for an automatic transmission according to the present invention.
Figure 1B:
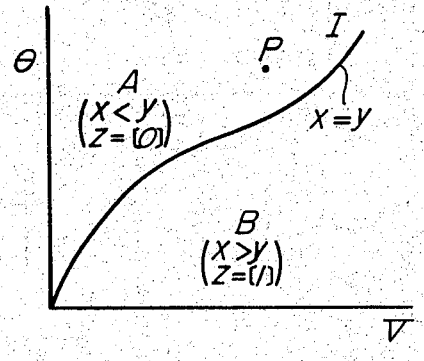

In FIG. 1a, there is shown a first comparing amplifier $C_1$ used in an automatic shift line switchover system for an automatic transmission according to the present invention. An automatic shift line I determined by signals applied to the first comparing amplifier $C_1$ is shown in FIG. 1b, from which it will be seen that the automatic shift line I is generally in the form of a curve. The automatic shift line I lies on a plane defined by two axes representative of two independent variables such as vehicle speed V and throttle position Θ and bisects the plane into two regions A and B. An input voltage $x=f_1(V)$ which is a function of the vehicle speed V and an input voltage $y=g_1(\Theta)$ which is a function of the throttle position Θ are applied to a noninverted input terminal $2a$ and an inverted input terminal $2b$, respectively, of the first comparing amplifier $C_1$, and a binary output signal $z=$"0" or "1" appears at the output terminal $2c$ of the first comparing amplifier $C_1$ depending on the relative magnitude of the input voltages $x$ and $y$. Here, "1" means that a signal is delivered from the comparing amplifier $C_1$, while "0" means that no signal is delivered therefrom. A point P on the coordinate plane in FIG. 1b is represented by the corresponding values of the throttle position Θ and the vehicle speed V. The shift line I bisecting this plane represents a coordinate group where the input voltages $x$ and $y$ applied to the first comparing amplifier $C_1$ are equal to each other. Thus, the relation $x=y$, hence, $f_1(V)=g_1(\Theta)$ holds on the shift line I. Suppose that the input voltage $x$ is smaller than the input voltage $y$ in the region A, and the input voltage $x$ is larger than the input voltage $y$ in the region B, then all the coordinates in the region A satisfy the relation $x<y$, and all the coordinates in the region B satisfy the relation $x>y$. An output signal $z=$"0" is delivered from the first comparing amplifier $C_1$ when the relation $x<y$ is satisfied, while an output signal $z=$"1" is delivered from the first comparing amplifier $C_1$ when the values of the vehicle speed V and the throttle position Θ fall within the region B in which the relation $x>y$ is satisfied.

Figure 2A:
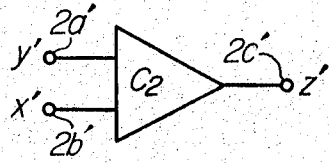
FIG. 2a is a block diagram of a second comparing amplifier forming part of the system according to the present invention.
Figure 2B:
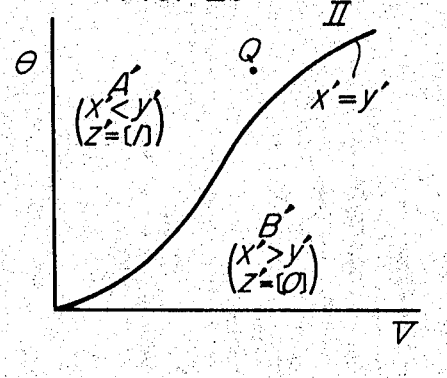

In FIG. 2a, there is shown a second comparing amplifier $C_2$. An automatic shift line II determined by signals applied to the second comparing amplifier $C_2$ is shown in FIG. 2b. Like the shift line I described above, the shift line II lies on a plane defined by two axes representative of the two independent variables V and Θ and bisects the plane into two regions A' and B'. An input voltage $x'=f_2(V)$ which is a function of the vehicle speed V and an input voltage $y'=g_2(\Theta)$ which is a function of the throttle position Θ are applied to an inverted input terminal $2b'$ and a noninverted input terminal $2a'$, respectively, of the second comparing amplifier $C_2$, and a binary output signal $z'=$"0" or "1" appears at the output terminal $2c'$ depending on the relative magnitude of the input voltages $x'$ and $y'$. A point Q on the coordinate plane in FIG. 2b is represented by the corresponding values of the throttle position Θ and the vehicle speed V. The shift line II bisecting this plane represents a coordinate group where the input voltages $x'$ and $y'$ are applied to the second comparing amplifier $C_2$ are equal to each other. Thus, the relation $x'=y'$, hence, $f_2(V)=g_2(\Theta<)$ holds on the shift line II. Suppose that the input voltage $x'$ is smaller than the input voltage $y'$ in the region A', and the input voltage $x'$ is larger than the input voltage $y'$ in the region B', then all the coordinates in the region A' satisfy the relation $x'<y'$, and all the coordinates in the region B' satisfy the relation $x'>y'$. An output signal $z'=$"1" is delivered from the second comparing amplifier $C_2$ when the relation $x'<y'$ is satisfied, while an output signal $z'=$"0" is delivered from the second comparing amplifier $C_2$ when the values of the vehicle speed V and the throttle position Θ fall within the region B' in which the relation $x'>y$ is satisfied.

Figure 3:
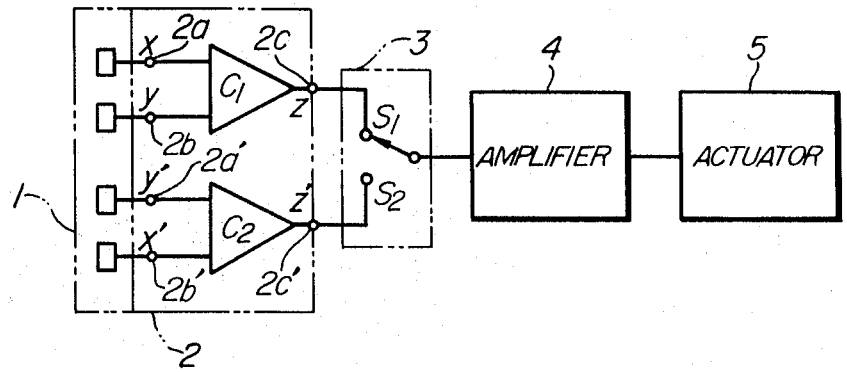
FIG. 3 is a block diagram showing the structure of an embodiment of the automatic shift line switchover system according to the present invention.

The present invention is featured by the fact that the output signals delivered from the comparator composed of the comparing amplifiers $C_1$ and $C_2$ are switched over by a switching section so as to select one of the automatic shift lines. Referring to FIG. 3, an embodiment of the present invention comprises a signal generator unit 1 generating signal voltages for determining the automatic shift lines, a comparator 2, a switching section 3, an amplifier means 4, and an actuator means 5 such as a solenoid or motor for actuating the valve in the automatic transmission. The signal generator unit 1 generates two signal voltages $x$ and $x'$ which are each a fixed function of the vehicle speed V and two signal voltages $y$ and $y'$ which are each a fixed function of the throttle position Θ. The comparator 2 includes a first comparing amplifier $C_1$ and a second comparing amplifier $C_2$ of the kind described with reference to FIGS. 1a and 2a. The first comparing amplifier $C_1$ delivers an output signal $z$ by comparing the input voltage $x$ with the input voltage $y$ with high precision, while the second comparing amplifier $C_2$ delivers an output signal $z'$ by comparing the input voltage $x'$ with the input voltage $y'$ with high precision.

The operation of the system of the present invention $z=$in FIG. 3 will be described with reference to FIGS. 1b and 2b. Referring to FIG. 1b, it is supposed that a point $P_0$ ($V_0$, $\Theta_0$) lies in the region A on one side of the automatic shift line I, and a point $Q_0$ ($V_0$, $\Theta_0$) corresponding to the point $P_0$ ($V_0$, $\Theta_0$) lies also in the region A' in FIG. 2b. In this case, an output signal $z=$"0" is delivered from the first comparing amplifier $C_1$, while an output signal $z'=$"1" is delivered from the second comparing amplifier $C_2$ as described previously. The output signal delivered from the first comparing amplifier $C_1$ is applied to the amplifier means 4 to be amplified therein so as to energize the actuator means 5 when the switching section 3 is in a position $S_1$ as shown. It is to be noted that the phase of the input to the amplifier means 4 is so selected that the actuator means 5 is energized in response to the output signal $z=$"0" delivered from the first comparing amplifier $C_1$. When the point $P_0$ moves into the region B in FIG. 1b, an output signal $z=$"1" is now delivered from the first comparing amplifier $C_1$ with the result that the actuator means 5 is deenergized. The point $Q_0$ lies in the region A' when the point $P_0$ lies in the region A. Thus, an output signal $z'=$"1" is delivered from the second comparing amplifier $C_2$ to be applied to the amplifier means 4 to deenergize the actuator means 5 when the switching section 3 is in a position $S_2$ in FIG. 3. The above relation is tabulated in the following table:

| Coordinates in Fig. 1b, $P_0(V_0,\Theta_0)$ | Coordinates in Fig. 2b, $Q_0(V_0,\Theta_0)$ | Output from comparing amplifier $C_1$, $z$ | Output from comparing amplifier $C_2$, $z'$ | Switching section 3 | Actuator means 5 |
|---|---|---|---|---|---|
| Region A | Region A' | "0" | "1" | $S_1$ | Energized. |
|  |  |  |  | $S_2$ | De-energized. |
| Region B | Region A' | "1" | "1" | $S_1$ | De-energized. |
|  |  |  |  | $S_2$ | De-energized. |
| Region A | Region B' | "0" | "0" | $S_1$ | Energized. |
|  |  |  |  | $S_2$ | Energized. |
| Region B | Region B' | "1" | "0" | $S_2$ | De-energized. |
|  |  |  |  | $S_1$ | Energized. |

Figure 4:
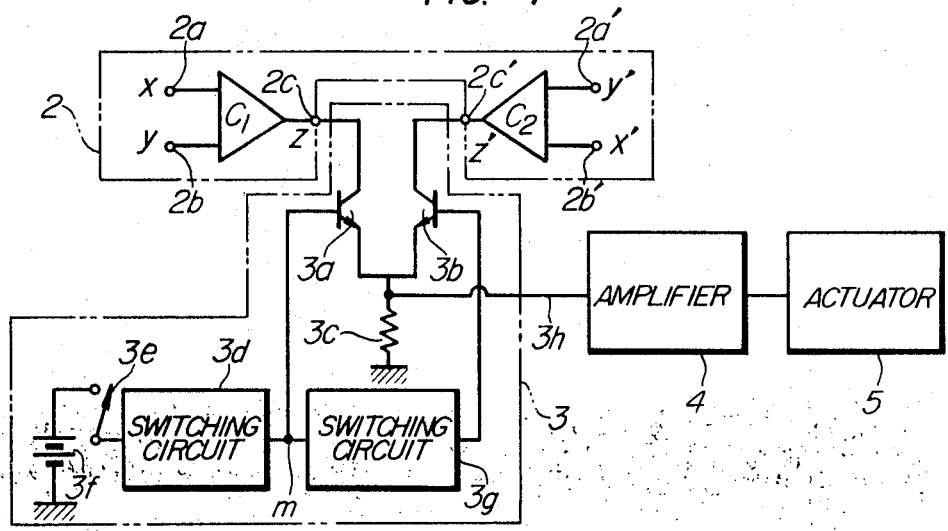
FIG. 4 is a block diagram showing the structure of parts of another embodiment of the present invention.

Another embodiment of the present invention shown in FIG. 4 is generally similar to the embodiment shown in FIG. 3 except that the switching means in the switching section 3 in the latter is replaced by transistors. Like reference numerals are used in FIG. 4 to denote like parts appearing in FIG. 3.

The system shown in FIG. 4 includes a comparator 2 which is composed of a first comparing amplifier $C_1$ and a second comparing amplifier $C_2$. The presence of a point P (V, Θ) in either of the regions A and B in FIG. 1b is identified by the appearance of "1" or "0" from the first comparing amplifier $C_1$ depending on the relative magnitude of input voltage x and y. Similarly, the presence of a point Q (V, Θ) in either of the regions A' and B' in FIG. 2b is identified by the appearance of "1" or "0" from the second comparing amplifier $C_2$ depending on the relative magnitude of input voltages x' and y'. The input voltages $x=f_1(V)$ and $y=g_1(\Theta)$ are applied to a noninverted input terminal 2a and an inverted input terminal 2b, respectively, of the first comparing amplifier $C_1$, while the input voltages $y'=g_2(\Theta)$ and $x'=f_2(V)$ are applied to a noninverted input terminal 2a' and an inverted input terminal 2b', respectively, of the second comparing amplifier $C_2$. An output signal $z=$"1" appears at the output terminal 2c of the first comparing amplifier $C_1$ when $x>y$ (region B), while an output signal $z=$"o" appears at the output terminal 2c when $x<y$ (region A). Similarly, an output signal $z'=$"o" appears at the output terminal 2c' of the second comparing amplifier $C_2$ when $x'>y'$ (region B'), while an output signal $z'=$"1" appears at the output terminal 2c' when $x'<y'$ (region A').

A switching section 3 includes a pair of transistors 3a and 3b which have their emitters connected in common to one end of a load resistor 3c which is grounded at the other end thereof. The collectors of the transistors 3a and 3b are connected to the output terminals 2c and 2c' of the respective comparing amplifiers $C_1$ and $C_2$. An amplifying, shaping and switching circuit 3d is connected at its input side to a power supply 3f through a selector switch 3e. A switching circuit 3g is connected at its input side to the output side of the amplifying, shaping and switching circuit 3d and acts to invert the output from the amplifying, shaping and switching circuit 3d. The output terminal 3h of the switching section 3 is connected to an actuator means 5 through an amplifier means 4. The base of the transistor 3a is connected to the output side of the amplifying, shaping and switching circuit 3d, while the base of the transistor 3b is connected to the output side of the switching circuit 3g. Because of such an arrangement, the switching signal is applied to only one of the bases of the transistors 3a and 3b. In the open position of the switch 3e, the amplifying, shaping and switching circuit 3d delivers an output signal $m=$"1," and therefore, an output signal $\overline{m}=$"0" is delivered from the switching circuit 3g. As a result, the transistor 3a conducts by being urged by the output voltage supplied from the amplifying, shaping and switching circuit 3d, while the transistor 3b is cut off. In this instance, the output signal delivered from the first comparing amplifier $C_1$ is a sole output signal delivered from the comparator 2 and appears across the load resistor 3c, while the output signal delivered from the second comparing amplifier $C_2$ cannot appear due to the cutoff of the transistor 3b. On the other hand, when the switch 3e is urged to the closed position and the voltage of the power supply 3f is applied to the input side of the amplifying, shaping and switching circuit 3d, an output signal $m=$"0," or no output signal is delivered from the amplifying, shaping and switching circuit 3d and an output signal $\overline{m}=$"1" is delivered from the switching circuit 3g, with the result that the transistor 3a is cut off and the transistor 3b conducts. Thus, the output signal delivered from the second comparing amplifier $C_2$ appears across the load resistor 3c, and the signal appearing across the load resistor 3c is independent of any variation in the output signal delivered from the first comparing amplifier $C_1$. The output signal delivered from the comparing amplifier $C_1$ or $C_2$ and appearing across the resistor 3c depending on the position of the switch 3e is applied to the amplifier means 4 and is amplified by the amplifier means 4 to be applied to the actuator means 5 which may be a motor or solenoid. The amplifier means 4 includes a plurality of amplification stages. The amplifier means 4 employed in the embodiment shown in FIG. 4 is such that it energizes the actuator means 5 when "0" appears across the resistor 3c and deenergizes the actuator means 5 when "1" appears across the resistor 3c.

Figure 5:
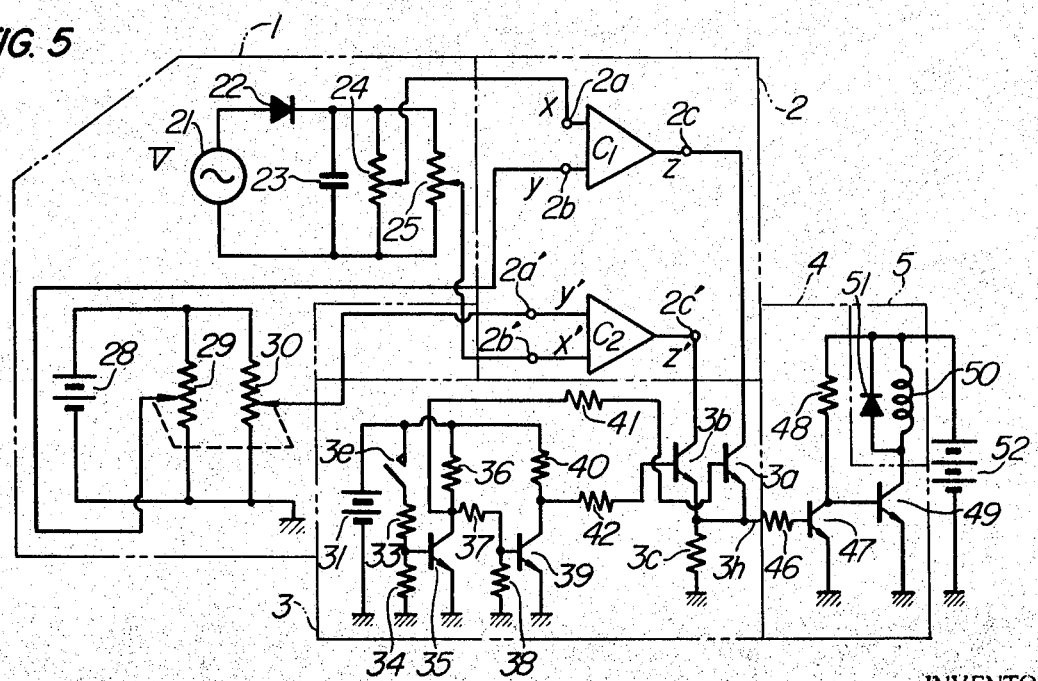
FIG. 5 is an electrical connection diagram showing the structure of a further embodiment of the present invention.
Figure 6:
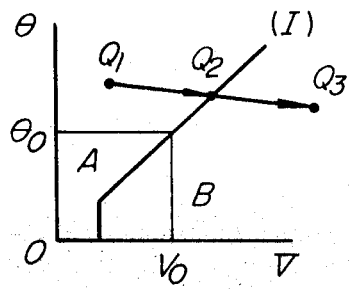
FIGS. 6 and 7 are automatic shift diagrams illustrating the operation of the first and second comparing amplifiers forming parts of the system shown in FIG. 5.
Figure 7:
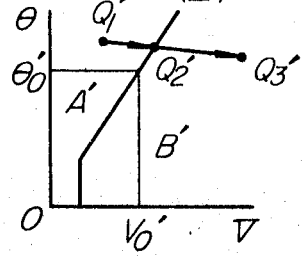

FIG. 5 is an electrical circuit diagram of a further embodiment of the present invention, and FIGS. 6 and 7 are automatic shift diagrams showing automatic shift lines determined depending on the signals delivered from a signal generator unit 1. In FIGS. 6 and 7, the vehicle speed V in kilometers per hour and the throttle position Θ in degrees are taken as independent variables, and the automatic shift lines I and II are given by straight lines passing through the origin.

Referring to FIG. 5 wherein like reference numerals are used to denote like parts appearing in FIG. 4, the signal generator unit 1 includes a tachogenerator 21 for generating a signal representative of the vehicle speed, a diode 22 and a capacitor 23. The AC voltage generated by the tachogenerator 21 is rectified by the diode 22 so that a voltage proportional to the vehicle speed V appears across the capacitor 23. Variable resistors 24 and 25 divide the terminal voltage of the capacitor 23. Suppose that the voltage division ratio of the variable resistor 24 is $k_1$, then an input voltage $x=k_1V$ is applied to an inverted input terminal 2a of a first comparing amplifier $C_1$. Suppose further that the voltage division ratio of the variable resistor 25 is $k_2$, then an input voltage $x'=k_2V$ is applied to a noninverted input terminal 2b' of a second comparing amplifier $C_2$. Variable resistors 29 and 30 are connected to a power supply 28 and cooperate with means responsive to the throttle position Θ so as to convert the throttle position into a corresponding voltage. Suppose that the voltage division ratio of the variable resistor 29 is $m_1$, then an input voltage $y=m_1\Theta$ is applied to a noninverted input terminal 2b of the first comparing amplifier $C_1$. Suppose further that the voltage division ratio of the variable resistor 30 is $m_2$, then an input voltage $y'=m_2\Theta$ is applied to an inverted input terminal 2a' of the second comparing amplifier $C_2$. While the variable resistors 29 and 30 of the type in which the resistance value is continuously variable are shown herein by way of example, they may be resistors whose resistance value is discontinuously varied by a plurality of lead switches which are successively closed by a magnet rotating with the throttle shaft. In this latter case, a stably operating device can be provided by virtue of the hysteresis characteristic of the lead switches. Further, a feedback circuit may be provided between the output terminal 2c and the inverted input terminal 2a of the comparing amplifier $C_1$ so as to utilize the hysteresis relative to the vehicle speed.

In response to application of the two input signals $x=k_1V$ and $y=m_1\Theta$ to the first comparing amplifier $C_1$, an output signal $z=$"1" is delivered therefrom when $x>y$, hence, $k_1V>m_1\Theta$, while an output signal $z=$"0" is delivered therefrom when $x<y$, hence, $k_1V<m_1\Theta$. Referring to FIG. 6, a shift occurs at a vehicle speed $V_o$ when the throttle position is $\Theta_o$. Thus, by setting one of $k_1$ and $m_1$ at a suitable value, the other can be sought from the equation $k_1V_o=m_1\Theta_o$. The automatic shift line I in FIG. 6 is a straight line represented by the equation $$\theta = \frac{k_1}{m_1}V$$

and the coordinate plane defined by the vehicle speed V and the throttle position Θ is bisected by the automatic shift line I into a region A wherein the output signal z is "0" and a region B wherein the output signal z is "1." As the driving conditions of the vehicle make a shift from a point $Q_1(\Theta_1, V_1)$ satisfying the relation $$\theta_1 > \frac{k_1}{m_1}V_1$$

to a point $Q_3(\Theta_3, V_3)$ satisfying the relation $$\theta_3 < \frac{k_1}{m_1}V_3$$

the output signal z delivered from the first comparing amplifier $C_1$ changes from "0" to "1" at a point $Q_2(\Theta_2, V_2)$ satisfying the relation $$\theta_2 = \frac{k_1}{m_1} V_2$$

The same applies to the second comparing amplifier $C_2$. In response to the application of the two input signals $x'=k_2V$ and $y'=m_2\theta$ to the second comparing amplifier $C_2$, an output signal $z'=$"0" is delivered therefrom when $x'>y'$, hence, $k_2V>m_2\theta$, while an output signal $z'=$"1" is delivered therefrom when $x'<y'$, hence, $k_2V<m_2\theta$. Referring to FIG. 7, a shift occurs at a vehicle speed $V_o'$ when the throttle position is $\theta_o'$. Thus, by setting one of $k_2$ and $m_2$ at a suitable value, the other can be sought from the equation $k_2V_o'=m_2\theta_o'$. The automatic shift line II in FIG. 7 is a straight line represented by the equation $$\theta = \frac{k_2}{m_2} V$$

and the coordinate plane defined by the vehicle speed V and the throttle position $\theta$ is bisected by the automatic shift line II into a region A' wherein the output signal $z'$ is "1" and a region B' wherein the output signal $z'$ is "0." As the driving conditions of the vehicle make a shift from a point $Q_1'(\theta_1', V_1')$ satisfying the relation $$\theta_1' > \frac{k_2}{m_2} V_1'$$

to a point $Q_3'(\theta_3', V_3')$ satisfying the relation $$\theta_3' < \frac{k_2}{m_2} V_3'$$

the output signal $z'$ delivered from the second comparing amplifier $C_2$ changes from "1" to "0" at a point $Q_2'(\theta_2', V_2')$ satisfying the relation $$\theta_2' = \frac{k_2}{m_2} V_2'$$

A switching section 3 includes an automatic shift line selector switch 3e cooperating with the change lever, a power supply 31, resistors 33, 34, 36, 37, 38 and 40, and transistors 35 and 39 for effecting the amplification and inversion of the switching signal depending on the position of the switch 3e. Transistors 3a and 3b are operative to selectively derive the outputs from the comparing amplifiers $C_1$ and $C_2$. The collector of the transistor 3a is connected to the output terminal 2c of the first comparing amplifier $C_1$, while the collector of the transistor 3b is connected to the output terminal 2c' of the second comparing amplifier $C_2$. The emitters of these transistors 3a and 3b are connected in common to one end of a resistor 3c, hence, to an output terminal 3h, and the other end of the resistor 3c is grounded to constitute an emitter follower circuit. The bases of the transistors 3a and 3b are connected to the collectors of the transistors 35 and 39 through resistors 41 and 42, respectively. The signal appearing across the resistor 3c is applied to the base of a transistor 47 in an amplifier means 4 through a resistor 46. The transistor 47 has a load resistor 48 connected therewith. The collector of the transistor 47 is connected to the base of a transistor 49. An actuator means 5 is connected to the collector of the transistor 49 and includes a solenoid 50 and a diode 51 for suppressing the voltage induced in the solenoid 50. The transistors 47 and 49 have their emitters grounded, and a power supply 52 supplies power to the transistors 47 and 49 and to the actuator means 5. The comparing amplifiers $C_1$ and $C_2$ are also connected to a power supply (not shown).

The operation of the automatic shift line switchover system shown in FIG. 5 will be described with reference to the automatic shift diagrams shown in FIGS. 6 and 7. The system according to the present invention gives such instructions that the gear unit in the transmission takes the low gear position when the vehicle speed V and the throttle position $\theta$ lie in the region A in FIG. 6 and the high gear position when the vehicle speed V and the throttle position $\theta$ lie in the region B in FIG. 6. The solenoid 50 is energized in the low gear position and is deenergized in the high gear position. Similarly, the system gives such instructions that the gear unit in the transmission takes the low and the high gear position, respectively, when the vehicle speed V and the throttle position $\theta$ lie in the regions A' and B' in FIG. 7. In this latter case, however, the operation of the solenoid 50 is contrary to the case of FIG. 6 so that the solenoid is deenergized in the low gear position and energized in the high gear position. The mechanical operation for shifting the gear between low and high gear is associated with the position of the switch 3e.

The selector switch 3e is in the open position when the vehicle runs on a level road. Due to the open position of the switch 3e, the transistor 35 is cut off and the transistor 39 conducts with the result that the transistor 3a conducts and the transistor 3b is cut off. The voltage of the power supply 31 is selected to be higher than the voltage appearing across the resistor 3c when the output signals $z$ and $z'$ delivered from the comparing amplifiers $C_1$ and $C_2$ are "1." Thus, current is supplied from the first comparing amplifier $C_1$ to the resistor 3c through the transistor 3a, but no current is supplied from the second comparing amplifier $C_2$ to the resistor 3c due to the fact that the transistor 3b is cut off. Suppose now that the vehicle speed V and the throttle position $\theta$ have respective values of $V_1$ and $\theta_1$ represented by the point $Q_1(V_1, \theta_1)$ lying in the region A in FIG. 6, then it is apparent from the previous description that the relation $$\theta_1 > \frac{k_1}{m_1} V_1$$

hence, $y_1=m_1\theta_1>x_1=k_1V_1$ holds at this point $Q_1$. Since, in this case, the relation $y>x$ holds between the input voltages applied to the first comparing amplifier $C_1$, the output signal $z$ is "0" and no voltage appears across the resistor 3c. As a result, the transistor 47 is cut off and the transistor 49 conducts to energize the solenoid 50 so that the gear unit in the transmission takes the low gear position. As the vehicle speed V and the throttle position $\theta$ vary from the point $Q_1$ to the point $Q_3$ via the point $Q_2$ in FIG. 6, the relation $y>x$ between the input voltages $x$ and $y$ applied to the first comparing amplifier $C_1$ is changed to the relation $y<x$ at the transition point $Q_2$, and the output signal $z$ delivered from the comparing amplifier $C_1$ is changed from "0" to "1." Thus, "1" appears across the resistor 3c so that the transistor 47 conducts and the transistor 49 is cut off. This results in the deenergization of the solenoid 50 and the gear unit in the transmission is shifted to high gear.

The selector switch 3e is in the closed position when the vehicle runs on a mountainous or like road. Due to the closed position of the switch 3e, the transistor 35 conducts and the transistor 39 is cut off with the result that the transistor 3a is cut off and the transistor 3b conducts. In this state, an output signal $z'$ is delivered from the second comparing amplifier $C_2$ to appear across the resistor 3c. Suppose now that the vehicle speed V and the throttle position $\theta$ have respective values of $V_1'$ and $\theta_1'$ represented by the point $Q_1'(V_1', \theta_1')$ lying in the region A' in the automatic shift diagram shown in FIG. 7, then it is apparent from the previous description that the relation $$\theta_1' > \frac{k_2}{m_2} V_1'$$

hence, $y_1'=m_2\theta_1'>x_1'=k_2V_1'$ holds at this point $Q_1'$. Since, in this case, the relation $y'>x'$ holds between the input voltages applied to the second comparing amplifier $C_2$, the output voltage $z'$ is "1" and this voltage appears across the resistor 3c. As a result, the transistor 47 conducts and the transistor 49 is cut off to deenergize the solenoid 50 so that the gear unit in the transmission takes the low gear position. As the vehicle speed V and the throttle position $\theta$ vary from the point $Q_1'$ to the point $Q_3'$ via the point $Q_2'$ in FIG. 7, the relation $y'>x'$ between the input voltages $x'$ and $y'$ applied to the second comparing amplifier $C_2$ is changed to the relation $y'y<x'$ at the transition point $Q_2'$, and the output signal $z'$ delivered from the comparing amplifier $C_2$ is changed from "1" to "0." Thus, "0" appears across the resistor 3c so that the transistor 47 is cut off and the transistor 49 conducts. This results in the energization of the solenoid 50 and the gear unit in the transmission is shifted to high gear. The above operation is tabulated in the following table:

| Selector switch 3e | Solenoid 50 | |
| --- | --- | --- |
| | Energized | De-energized |
| Open (automatic shift line I) | Low gear | High gear. |
| Closed (automatic shift line II) | High gear | Low gear. |

The embodiments described above have referred to an application of the system of the present invention to a two-forward speed automatic transmission. However, the system can be easily applied to a three-forward speed automatic transmission. In this instance, the system shown in FIG. 5 may further include a third comparing amplifier, a 2-3 shift actuator means, a variable resistor connected in parallel with the variable resistors 24 and 25, and a variable resistor connected in parallel with the variable resistors 29 and 30 so that two voltages obtained by these additional variable resistors may be supplied to the third comparing amplifier to energize the 2-3 shift actuator means by the output signal delivered from the third comparing amplifier when the 2-3 shift is required. In this system, arrangement may be such that the second speed can be obtained when the 1-2 shift actuator means 5 is solely energized, the third speed can be obtained when both the 1-2 shift actuator means 5 and the 2-3 shift actuator means are energized, and the first speed can be obtained when both the actuator means are deenergized.

In the embodiments described above, the solenoid 50 is energized and deenergized respectively to obtain the first and the second speed in the drive range, while it is deenergized and energized respectively to obtain the first and the second speed in the low range. However, the manner of the operation of the comparing amplifiers may be changed so that the energization and deenergization of the solenoid 50 give the first (or second) and second (or first) speed in both the drive range and the low range.

We claim:

1. An automatic shift line switchover system for use in an automatic transmission for a vehicle comprising a signal generator unit for generating signal voltages which are fixed functions of the vehicle speed and throttle position for determining a plurality of automatic shift lines, a first and a second comparing amplifier for carrying out the comparison between the vehicle speed responsive signal and the throttle position responsive signal applied from said signal generator unit so as to discriminate as to whether the vehicle speed and the throttle position lie in a region in which an output signal is generated from said comparing amplifiers or in a region in which no output signal is generated from said comparing amplifiers, a switching section including two transistors which have their collectors connected respectively to the output terminals of said comparing amplifiers and their emitters connected to a common output terminal to constitute an emitter follower circuit, a switch and a transistor circuit in said switching section for selectively applying a switching signal to the input terminals of said emitter follower circuit for selecting one of the output signals delivered from said first and second comparing amplifiers so as to derive the selected output signal from said output terminal of said switching section, and an actuator means connected to said output terminal of said switching section.

* * * * *